United States Patent [19]
DeFazio

[11] Patent Number: 5,199,143
[45] Date of Patent: Apr. 6, 1993

[54] SHAVING MACHINE

[76] Inventor: August DeFazio, 33 Forman La., Englishtown, N.J. 07726

[21] Appl. No.: 875,394

[22] Filed: Apr. 29, 1992

Related U.S. Application Data

[62] Division of Ser. No. 704,210, May 22, 1991.

[51] Int. Cl.$^5$ .............................................. B21C 43/00
[52] U.S. Cl. .............................. 29/81.11; 51/281 SF; 51/74 R
[58] Field of Search .................. 29/403.3, 81.11, 81.12, 29/81.16, 403.1, 426.4, 426.5, 426.1; 15/93.1; 134/2, 19; 241/14; 264/37; 51/281 SF, 74 R, 103 TF, 326

[56] References Cited

U.S. PATENT DOCUMENTS 2,189,578  2/1940  Crouse et al. ............... 29/403.3 X
4,992,223  2/1991  Nelson ........................... 29/460 X Primary Examiner—Timothy V. Eley
Attorney, Agent, or Firm—Connolly & Hutz

[57] ABSTRACT

Plastics having coatings are reused by first removing the coatings as by shaving or treatment with solvents or jets of hot liquid or vapor that melt the coatings and blow them away. Thin plastic pieces like compact discs are passed through surface milling apparatus which shaves off the coatings. After the shaving, the discs are brushed while rotating around their centers.

2 Claims, 1 Drawing Sheet

SHAVING MACHINE

CROSS-REFERENCE TO RELATED APPLICATION

This application is a division of application Ser. No. 07/704,210 filed May 22, 1991.

BACKGROUND OF INVENTION

The present invention relates to the recovery of plastic for re-use.

SUMMARY OF INVENTION

Among the objects of the present invention are the provision of novel methods and apparatus for recovering used plastic.

Additional objects of the present invention are treatments for recovering plastic from compact discs that are defective or damaged or surplus.

THE DRAWINGS

The foregoing as well as still further objects will be more fully understood from the following description of several embodiments of the present invention, reference being made to the accompanying drawings, wherein:

FIG. 1 is an enlarged transverse sectional detail view of a compact disc used for audio recordings and the like; and FIG. 2 is a plan view of the details of a recovery treatment pursuant to the present invention.

DETAILED DESCRIPTION

Plastics are generally re-usable after they have been formed into commercial products. They can in many cases be remelted and formed again.

Such re-use of plastics is particularly significant where the plastics are of the more expensive kind such as polycarbonates. Compact discs used for audio recording or the like are made of such more expensive plastics, and their production is accompanied by rejects as well as damaged discs. Such discs are aluminized and coated during their production, and these treatments complicate the recovery.

According to the present invention, the salvaging of a compact disc is effected by shaving off the coatings with a specially arranged surface mill.

According to another aspect of the present invention, salvaging of plastics is effected by shaving down a face of the plastic with a shaving machine having rotating rubbery rollers that engage a face of the disc and feed it through an entrance slot, a shaving mill that engages and shaves a face of the disc after it passes through the entrance slot, a resiliently mounted centering pin that engages and centers the disc as it feeds forward, and means for brushing the disc edge and rotating the disc about the centering pin as it feeds forward.

Figure 1:
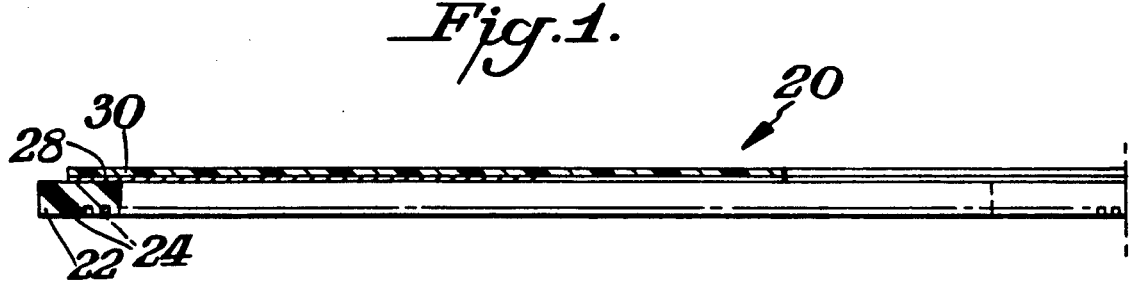

Turning now to the drawings, FIG. 1 illustates a currently manufactured compact disc 20, in enlarged detail. It can be a disc of transparent polycarbonate resin about one millimeter thick and about 12 centimeters in diameter. The disc's under face 22 is generally flat and provided with a multiplicity of generally cylindrical pockets 24 which are configured in a pattern that records an audio signal which can be played back by rotating the disc around its axis while the pockets are illuminated by laser beams.

The upper face of the disc is coated with a thin layer of specular metal 28—generally by aluminizing. The metal layer is in turn protected by a thin resin covering layer 30.

Both the metal layer and the resin coating need to be removed before the expensive plastic of the disc can be re-used most economically.

Figure 2:
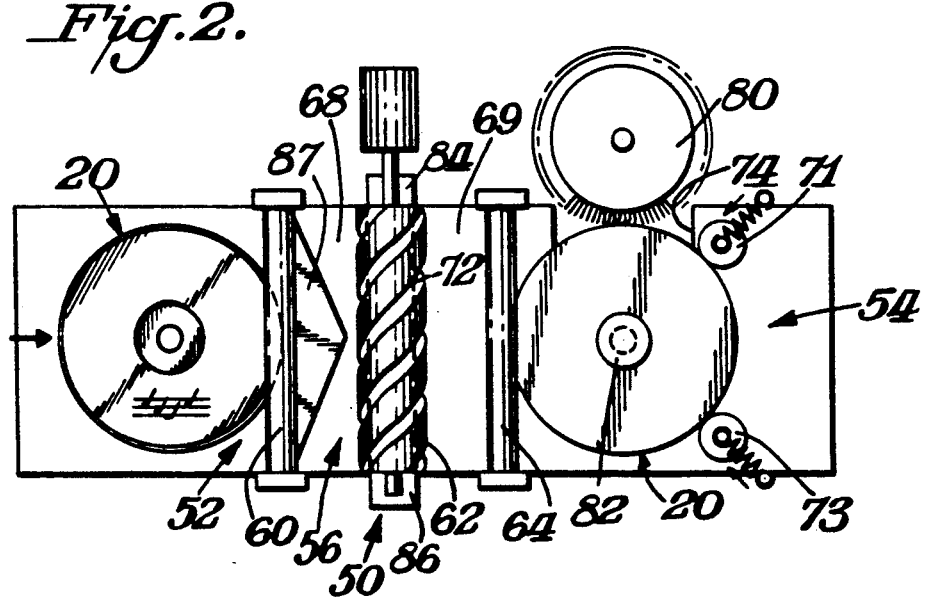

FIG. 2 is a diagrammatic illustration of an effective removal technique according to the present invention. A transporting assembly 50 is arranged to convey discs 20, 20 from an entrance position 52 to an exit position 54 through a passageway 56 that closely fits the disc. The passageway floor has a rubbery first feed roller 60 spaced from and followed by a surface mill 62 and then similarly followed by a second rubbery feed roller 64, ending with a set of spring loaded guide rolls 71, 73 that urge a transported disc toward a side 74 of the passageway and also hold that disc against the disc behind it in the passageway.

The passageway side 74 has an edge opening through which each passing disc projects its outer edge. A motor-driven rotary brush 80 engages the projecting edges and brushes them clean of any shavings and debris. The disc is then pushed past the spring-loaded rollers by the next disc, and thus discharged.

The passageway 56 is covered by a closely fitting roof, as noted, and through that roof a centering plunger 82 projects downwardly and is spring-urged toward the line along which the disc centers are carried. When an open disc center moves under the plunger, the plunger penetrates into the opening and momentarily holds the disc so that for a fraction of a second, the disc is rotated around its center by the very rapidly rotating brush 80. Brushing action at two to ten thousand rpm is effective.

To feed the discs, the passageway floor is provided with rubbery feed rollers that pinch against feed rollers 60 and 64 to effect the feeding action. Only one of the first set of rollers 60 need be power driven. A vacuum cleaning suction input can be placed under the floor as well as near the brush to suck off the shavings and debris. Spaces 68, 69 between the rollers and the mill are provided to permit the suction to remove shavings. If desired, the rubbery rollers can be backed up by all metal rolls that stiffen the pinching action of the rubbery rollers.

The surface mill 62 is held between bearing blocks 84, 86, adjacent a section 72 of the floor so that the mill can be rotated around its axis at high speed, generally over 2,000 revolutions per minute, and also raised or lowered a little to control the shaving depth. That depth is generally about 2 to 5 thousandths of an inch, and can be adjusted if necessary, by inspection of the brushed output, without interrupting the shaving.

The surface mill can be an end mill, one end of which is ground to form a bearing projection. A four-flute end mill one inch in diameter is typical, but its sharp flutes are desirably dulled to minimize the heat generation caused by the shaving. Removing the outermost two to three thousandths of an inch from the flutes by simple grinding is very effective and permits the shaving to be conducted at 60 to 70 discs per minute, without interruption and with little or no cooling. The drive for the shaving mill can be fixed to the bearing blocks 84, 86 so that it moves up and down with the blocks, or it can be a flexible drive in which event it can generate heat that needs controlling as by jets of cooling air when shaving at 3000 or more rpm.

Using a mill which is not dulled, significantly increases the heating and requires correspondingly significant cooling when the shaving is as low as 15 discs per minute.

Spacings 68, 69 are preferably about ¼ to about ⅜ inch wide in the feed direction although they can be somewhat narrower. A guide panel 87 can extend into opening 68 to help guide an incoming disc to the bight position of the mill and thus prevent a misdirected feed. However the panel is arranged to leave at least about half of opening 68 unblocked as by making the panel triangular in plan view, as illustrated. The triangle can be pointed up-feed or down-feed, and should leave about ⅛ inch gap in the feed. The shavings generated during operation are generally long, twisted and thread-like so that much of the unblocked portion of opening 68 should extend from one edge of the floor to the other. The shavings can be used for radar chaff or the like.

A vibratory feeder can be connected to supply the discs to the input rolls 60 from a bin in which the discs are collected for treatment. It may be desirable to equip such a feeder with a turnover station to turn over any discs that is feeds upside down. The turnovers can be manually controlled, or can be automatically responsive to the differences in reflectivity between the opposite faces of a disc or responsive to laser scanning that will show which face is being scanned.

Instead of shaving, the discs can be cleaned up by dissolving their plastic coatings and the aluminum layer. Strong aqueous caustic like a hot 20% NaOH solution in water loosens the plastic coating and dissolves the aluminum, but the coating removal is speeded by mixing a resin solvent like toluene with the caustic. Resin solvents that attack the plastic disc body should not be permitted to contact a disc for more than a minute or so.

In general, the discs can be scrubbed with an appropriate resin solvent and then with caustic, or with a mixture of the two, for about 20 to 30 seconds, or even less if the scrubbing is effected hot. The scrubbed disc is then rinsed with water and dried for packaging.

Dilute acid like 0.1 N aqueous hydrochloric acid can be used instead of caustic, in which event care should be taken to keep the equipment from the corroding effects of the acid.

The resin coating can also be removed by blasting the discs with jets of superheated steam hot enough to melt that resin and blow the melt off the disc. Adding a little caustic or acid to the steam jets will cause them to also remove the aluminum.

Sputtered or ion-implanted metals like titanium can also be removed by the shaving treatment or the chemical treatment using the dilute acid or superheated steam that reacts with titanium and other metals.

Obviously many modifications and variations of the present invention are possible in the light of the above teachings. It is therefore to be understood that within the scope of the appended claims the invention may be practiced otherwise than as specifically described.

What is claimed is:

1. A shaving machine for shaving down the face of a plastic compact disc, said machine having an entrance into which a disc would be inserted, a first rotating rubbery roller across said entrance for engaging a face of the disc and feeding the disc in a downstream direction away from said entrance, a shaving mill downstream from said first roller for engaging and shaving a face of the disc fed to said shaving mill by said first roller, a centering pin downstream from said shaving mill for temporarily preventing the disc from moving in a downstream direction, means mounted near said centering pin for brushing the edge of the disc and rotating the disc about said centering pin until the disc is again moved in a downstream direction by a further disc fed through said machine, and a second rotating rubbery roller downstream from said centering pin for ejecting the downstream most disc from said machine.

2. The machine of claim 1 wherein said centering pin is resiliently mounted, and said centering pin being located midway along the path of travel of the disc for entering an open disc center.

* * * * *